US012654466B2

(12) United States Patent
Yasuda

(10) Patent No.: US 12,654,466 B2
(45) Date of Patent: Jun. 16, 2026

(54) LIQUID EJECTION HEAD SUBSTRATE AND LIQUID EJECTION HEAD

(71) Applicant: CANON KABUSHIKI KAISHA, Tokyo (JP)

(72) Inventor: Takeru Yasuda, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 116 days.

(21) Appl. No.: 18/530,728

(22) Filed: Dec. 6, 2023

(65) Prior Publication Data

US 2024/0190140 A1 Jun. 13, 2024

(30) Foreign Application Priority Data

Dec. 9, 2022 (JP) ................................. 2022-197251

(51) Int. Cl.
*B41J 2/14* (2006.01)
*B41J 2/16* (2006.01)
*B41J 2/335* (2006.01)

(52) U.S. Cl.
CPC ....... *B41J 2/33505* (2013.01); *B41J 2/14072* (2013.01); *B41J 2/14129* (2013.01); *B41J 2/1603* (2013.01); *B41J 2202/03* (2013.01)

(58) Field of Classification Search
CPC ................ B41J 2/33505; B41J 2/14072; B41J 2202/03; B41J 2/14129; B41J 2/1603
See application file for complete search history.

(56) References Cited

U.S. PATENT DOCUMENTS

| | | | | |
|---|---|---|---|---|
| 7,950,769 | B2 | 5/2011 | Sakai et al. | |
| 8,123,330 | B2 | 2/2012 | Sakai et al. | |
| 8,491,087 | B2 | 7/2013 | Sakai et al. | |
| 9,050,805 | B2 | 6/2015 | Sakurai et al. | |
| 9,096,059 | B2 | 8/2015 | Hatsui et al. | |
| 10,933,635 | B2 | 3/2021 | Takeuchi et al. | |
| 11,318,744 | B2 | 5/2022 | Ishida et al. | |
| 2006/0223244 | A1* | 10/2006 | Nihei .................. | H10N 30/074 438/166 |
| 2007/0146428 | A1* | 6/2007 | Sakai .................. | B41J 2/16517 347/50 |
| 2011/0199421 | A1 | 8/2011 | Sakai et al. | |

(Continued)

FOREIGN PATENT DOCUMENTS

| | | |
|---|---|---|
| JP | 9-29985 A | 2/1997 |
| JP | 2008-105364 A | 5/2008 |

*Primary Examiner* — Yaovi M Ameh
(74) *Attorney, Agent, or Firm* — VENABLE LLP

(57) ABSTRACT

An object is suppressing the reduction in the gas barrier property in a case where the cavitation resistance layer becomes thin. An embodiment of the present invention is a liquid ejection head substrate, including: a first layer that forms a heating element that generates heat energy to eject a liquid; a second layer that functions as an electric wiring connected with the heating element; a third layer that is insulative and covers the first layer and the second layer; and a fourth layer that is a layer arranged over the third layer so as to cover at least the heating element, formed of metal, and to generate an electrochemical reaction with the liquid, in which a first average crystal particle diameter on a side that is in contact with the liquid and a second average crystal particle diameter on a side of the third layer are different.

16 Claims, 3 Drawing Sheets

(56) References Cited

U.S. PATENT DOCUMENTS

| | | | |
|---|---|---|---|
| 2012/0105537 | A1 | 5/2012 | Sakai et al. |
| 2022/0314619 | A1 | 10/2022 | Iwahashi et al. |
| 2023/0095423 | A1 | 3/2023 | Yasuda et al. |

* cited by examiner

LIQUID EJECTION HEAD SUBSTRATE AND LIQUID EJECTION HEAD

BACKGROUND

Field

The present disclosure relates to manufacturing of a liquid ejection head included in a printing apparatus using an inkjet printing method.

Description of the Related Art

There is one of the inkjet printing methods that allows for high-speed and high-quality printing by bubbling a liquid such as ink using beat energy.

A head (so-called liquid ejection head) that is used in the printing apparatus using the above-described inkjet printing method includes multiple ejection ports and multiple heating resistance elements. A pair of electric wirings are connected to the heating resistance element provided on a substrate, and a portion arranged between one end and the other end of the pair of electric wirings is defined as a substantial region of the heating resistance element. The electric wirings are provided on a back surface of a heating resistance element layer viewed from the substrate, that is, a surface on an ejection port side of the heating resistance element layer (details of a configuration of the liquid ejection head, particularly a configuration around the heating resistance element are described later with reference to drawings).

In order to protect the electric wirings and the heating resistance element from the liquid, the electric wirings and the heating resistance element are covered with a protection film. A current is applied from the electric wirings to the heating resistance element to heat the heating resistance element, and thus film boiling occurs in the liquid such as ink. Air bubbles generated in this process cause the ejection of the liquid from the ejection port, and the ejected liquid droplet lands on a printing medium; thus, printing is performed. It is easy to densely arrange each of the many ejection ports and the many heating resistance elements in the liquid ejection head as described above, and therefore it is possible to obtain a high-definition printing image.

Incidentally, in a case where a massive amount of printing is performed like a case of the printing apparatus for commercial use or industrial use, for example, the liquid ejection head is required to have further durability to improve the productivity. Particularly in a case of the method of performing the ejection by film-boiling the liquid, a heat acting portion of the liquid ejection head is subjected to physical action such as an impact from cavitation along with the bubbling or contraction of the liquid. Additionally, the heat acting portion is subjected to complex action by chemical action of the liquid heated to a high temperature.

Under the circumstances, Japanese Patent Laid-Open Nos. H9-29985 and 2008-105364 disclose, for example, a configuration in which a chemically stable material with a high hardness such as Ir is used for a cavitation resistance layer over the heating resistance element. In a case where the stable material such as Ir is used, in the above-described heat acting portion, a phenomenon in which color material, additive, and so on contained in the ink are decomposed on the molecular level by being heated at a high temperature, changed into a low solubility substance, and physically adsorbed on the cavitation resistance layer occurs. This phenomenon is referred to as "kogation". In order to perform the stable liquid bubbling, it is important to uniformly and reliably remove the kogation deposited on the heat acting portion.

Particularly, Japanese Patent Laid-Open No. 2008-105364 discloses a cleaning method for removing the accumulated kogation through a process of a series of printing processing. Specifically, a cleaning method in which the cavitation resistance layer is dissolved into the ink by using an electrochemical reaction that allows the cavitation resistance layer to act as an electrode, and thus the kogation accumulated on the cavitation resistance layer is removed in a simple manner is disclosed. In this case, it is more favorable to remove the kogation uniformly and reliably for the stable liquid bubbling.

SUMMARY

However, in a case of using the method disclosed in Japanese Patent Laid-Open No. 2008-105364, a film thickness of the cavitation resistance layer is decreased each time the cleaning is performed. For this reason, as the cleaning is repeated, the cavitation resistance layer becomes thinner gradually, the protection function thereof is lost accordingly, and finally the heating resistance element (also referred to as a heating element) is broken, which causes a failure of the head. Particularly, according to the recent researches, it is known that an important cause of the breakage of the heating element is a reduction in the gas barrier property in a case where the film thickness of the cavitation resistance layer is decreased.

Therefore, in light of the above-described problem, an object of the present disclosure is to suppress the reduction in the gas barrier property in a case where the cavitation resistance layer becomes thin.

An embodiment of the present invention is a liquid ejection head substrate, including: a first layer that forms a heating element that generates heat energy to eject a liquid; a second layer that functions as an electric wiring connected with the heating element: a third layer that is insulative and covers the first layer and the second layer; and a fourth layer that is a layer arranged over the third layer so as to cover at least the heating element, formed of metal, and to generate an electrochemical reaction with the liquid, in which a first average crystal particle diameter on a side that is in contact with the liquid and a second average crystal particle diameter on a side of the third layer are different.

Further features of the present invention will become apparent from the following description of exemplary embodiments with reference to the attached drawings.

DESCRIPTION OF THE EMBODIMENTS

First Embodiment

Problem To Be Solved by Present Embodiment (Supplemental to Above-Described Problem)

In general, a noble metal material such as Ir has been known to have bad adhesiveness with an insulation film of SiN, SiO, or the like. To deal with this, a configuration for a case where the noble metal material such as Ir is arranged over the insulation film in which an adhesive layer of Ta or the like is inserted between the insulation film and the noble metal layer to improve the adhesiveness has been known.

On the other hand, a base metal that is used as the adhesive layer such as Ta has been known as an easily-oxidized material. An oxygen atom in the atmosphere is diffused in the film along a crystal grain boundary of a cavitation resistance layer, and a base metal layer arranged as the adhesive layer is oxidized, which causes volume expansion. Specifically, in a case where a diffusion length of the oxygen atom that is determined based on the temperature is shorter than a path length of the crystal grain boundary, which is a diffusion path of the oxygen atom, the oxygen atom reaches a surface of the adhesive layer and causes the oxidation expansion of the adhesive layer. A physical stress that occurs in this process breaks the cavitation resistance layer and causes the breakage of the heating element. In a case where the breakage of the heating element as described above occurs, the reliability of the liquid ejection head is reduced.

In light of the above-described problem, an object of the present embodiment is to provide a liquid ejection head with improved durability and reliability that suppresses the reduction in the gas barrier property in a case where the cavitation resistance layer formed of a chemically stable material becomes thin.

<Configuration of Liquid Ejection Head Substrate>

Figure 1A:
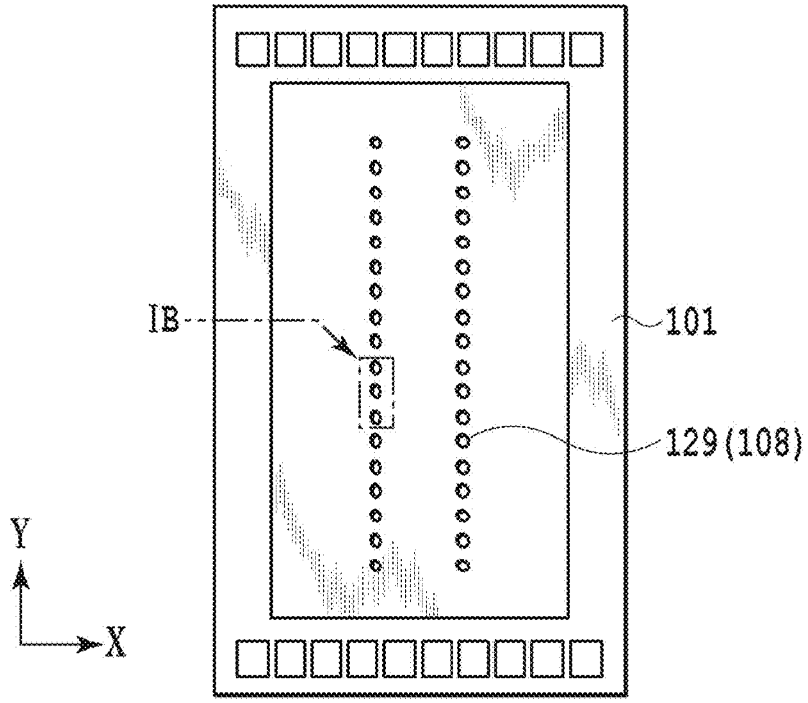
FIGS. 1A and 1B are each a plan view of a liquid ejection head substrate.
Figure 1B:
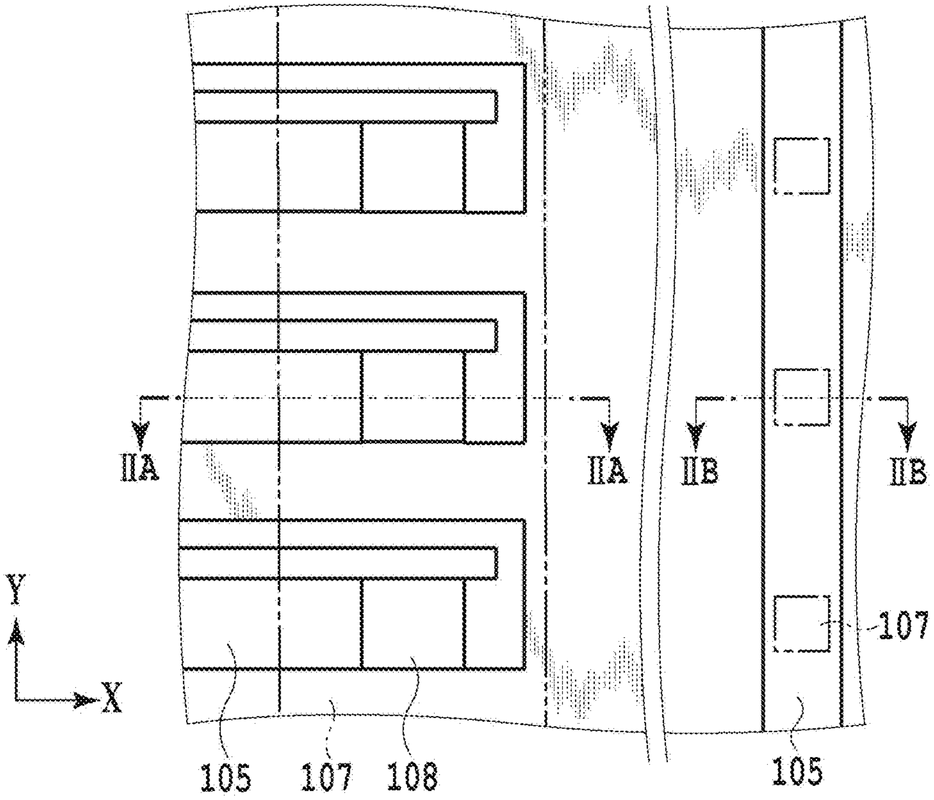

FIG. 1A is a plan view schematically illustrating a liquid ejection head substrate according to the present embodiment that is viewed from the above. FIG. 1B is a plan view related to a region surrounded by a dash-dotted line in FIG. 1A at a certain height and is specifically an enlarged schematic view of the vicinity of a heat acting portion.

Figure 2A:
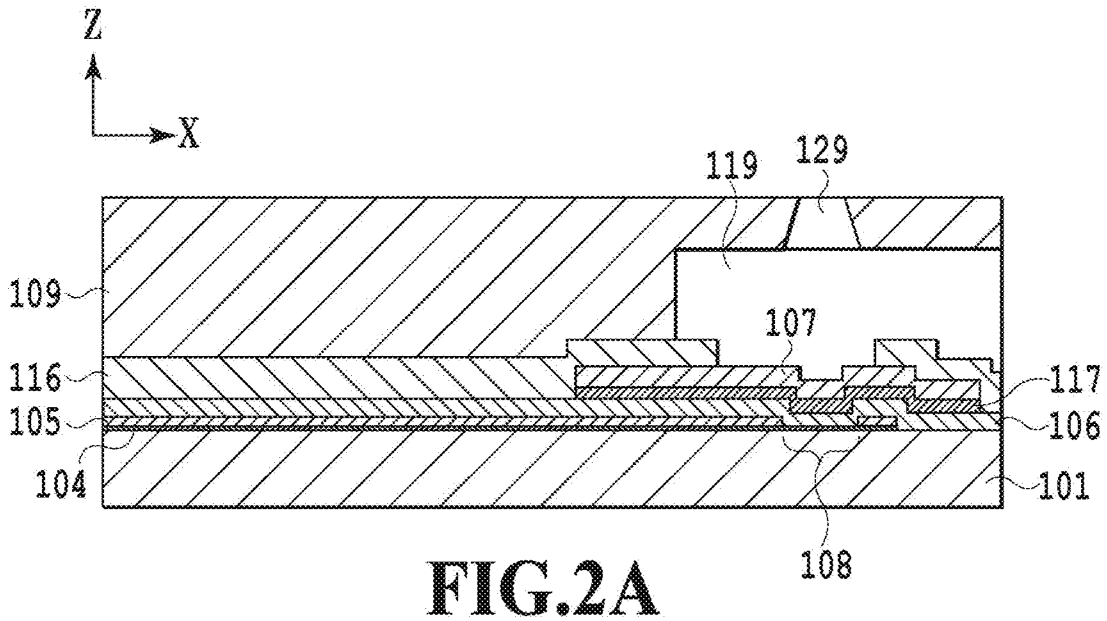
FIGS. 2A and 2B are each a cross-sectional view of the liquid ejection head substrate.
Figure 2B:
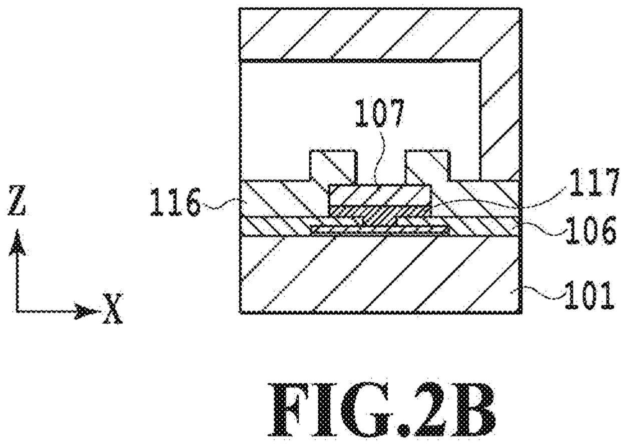

Additionally, FIG. 2A is a schematic cross-sectional view taken along a IIa-IIa line in FIG. 1B. FIG. 2B is a schematic cross-sectional view taken along a IIb-IIb line in FIG. 1B.

As illustrated in FIGS. 1A and 1B and FIGS. 2A and 2B, in the liquid ejection head, multiple layers are laminated to form the liquid ejection head substrate on a base 101 formed of silicon. In the present embodiment, a heat accumulation layer (not illustrated) formed of a thermal oxide film, a SiO film, a SiN film, or the like is arranged on the base 101. Additionally, a heating element layer 104 is arranged on the heat accumulation layer, and an electrode wiring layer 105 that is formed of a metal material such as Al, Al—Si, and Al—Cu and that functions as an electric wiring is arranged on the heating element layer 104. A first insulation protection layer 106 is arranged on the electrode wiring layer 105. The first insulation protection layer 106 is provided over the top of the heating element layer 104 and the electrode wiring layer 105 so as to cover them. The first insulation protection layer 106 is formed of a SiO film, a SiN film, a SiC film, a SiCN film, or the like. Note that, for the sake of convenience, the heating element layer 104 is referred to as a first layer, the electrode wiring layer 105 is referred to as a second layer, and the first insulation protection layer 106 is referred to as a third layer.

As illustrated in FIGS. 2A and 2B, an adhesive layer 117 and an upper protection layer 107 are arranged over the first insulation protection layer 106. The adhesive layer 117 is formed of a base metal including tantalum and the like so as to secure the adhesiveness between the first insulation protection layer 106 and the upper protection layer 107. The upper protection layer 107 protects a surface of a heating element 108 from a chemical and physical impact along with heating of the heating element 108. In the present embodiment, the upper protection layer 107 is formed of a platinum group (categorized as a noble metal) such as iridium (Ir) and ruthenium (Ru). Additionally, the upper protection layer 107 formed of the above material has conductivity. In a case where the ejection of the liquid such as ink is performed, the top of the upper protection layer 107 is in contact with the liquid, and it is a harsh environment in which the temperature of the liquid rises immediately on the top of the upper protection layer 107, bubbling occurs, the bubbles then disappear, and cavitation occurs. Thus, in the present embodiment, the upper protection layer 107 formed of a material with high corrosion resistance and high reliability is formed at a position at which the upper protection layer 107 covers the heating element 108. Note that, for the sake of convenience, the adhesive layer 117 is referred to as a fifth layer, and the upper protection layer 107 is referred to as a fourth layer.

In the present embodiment, the heating element 108 as an electrothermal conversion element that converts electricity into heat is formed by partially removing the electrode wiring layer 105. The heating element layer 104 and the electrode wiring layer 105 in the same shape are arranged to be overlapped with each other in a direction from a liquid supply port (not illustrated) to a liquid chamber (+z direction in FIG. 2A). Then, a part of the electrode wiring layer 105 is removed to form a gap in which there is no electrode wiring layer 105. Only the heating element layer 104 is arranged in this gap. As described above, it is a shape in which the electrode wiring layer 105 is removed and the heating element layer 104 is exposed in only a portion of the heating element layer 104 that corresponds to a portion that functions as the heating element 108.

The electrode wiring layer 105 is connected to a not-illustrated driving element circuit or external power supply terminal and is configured to receive power supply from the outside. Note that, in the present embodiment, a configuration in which the electrode wiring layer 105 is arranged on the heating element layer 104 is applied: however, the applicable scope of the technique of the present disclosure is not limited to this configuration. The technique of the present disclosure is applicable to a configuration in which electric energy is supplied from the outside. For example, the technique of the present disclosure is also applicable to a configuration in which the electrode wiring layer 105 is embedded in the heat accumulation layer (not illustrated), and the power is supplied to the heating element 108 formed as a single layer on the heat accumulation layer by using a metal plug of tungsten or the like.

In this case, the upper protection layer 107 is formed of lamination of the same materials having different crystal particle diameters. Specifically, on a side of a surface (a lower surface in FIG. 2A) that is in contact with the adhesive layer 117, a layer containing iridium with an average crystal particle diameter, which is a length of the upper protection layer 107 in a film-formed surface direction, of 1.5 nm is formed. On the other hand, on a side of a surface (an upper surface in FIG. 2A) that defines a flow channel 119 that is in contact with the liquid, a layer containing iridium with an average crystal particle diameter in the film-formed surface direction of 3.0 nm is formed. Note that, the average crystal particle diameter on the side of the surface (the upper surface in FIG. 2A) that defines the flow channel 119 and is in contact with the liquid is referred to as a "first average crystal particle diameter", and the average crystal particle diameter on the surface (the lower surface in FIG. 2A) that is in contact with the adhesive layer 117 is referred to as a "second average crystal particle diameter". The average crystal particle diameter in the upper protection layer 107 can be obtained by, for example, calculation from an observation result using a transmission electron microscope or calculation of a crystallite size from a diffraction peak obtained by an X-ray diffractometer.

Note that, in the present embodiment, the upper protection layer 107 is formed as described above. However, a similar effect as that of the above-described configuration is obtained also in a case where an iridium layer with the average crystal particle diameter in the film-formed surface direction of 3.0 nm is formed on the side of the surface that is in contact with the adhesive layer 117, and an iridium layer with the average crystal particle diameter in the film-formed surface direction of 3.0 nm is formed on the side of the surface that defines the flow channel 119 and is in contact with the liquid. However, since the resistance to the cavitation breakage that may occur in the liquid bubbling is stronger as the crystal particle diameter is greater, the crystal particle diameter of the layer on the side of the flow channel 119 that is in contact with the liquid is preferred to be relatively great. Additionally, a flow channel formation member 109 is formed over the first insulation protection layer 106 and a second insulation protection layer 116. The flow channel 119 to supply the liquid from the not-illustrated liquid supply port is formed by using the flow channel formation member 109, and an ejection port 129 to eject the liquid opens. Moreover, a layer (not illustrated) that improves the adhesiveness between the flow channel formation member 109 and the second insulation protection layer 116 may be formed between the two layers, and it is possible to implement good adhesiveness with the flow channel formation member by forming the layer from preferably a material such as SiO, SiCN, or SiOC.

Furthermore, it is assumed in the present embodiment that an electrochemical reaction between the upper protection layer 107 and the ink is used in order to remove the deposition on the heat acting portion. To this end, a through-hole (not illustrated) is formed in the first insulation protection layer 106 to electrically connect the upper protection layer 107 and the electrode wiring layer 105 with each other. Since the electrode wiring layer 105 is connected to a not-illustrated external electrode, the upper protection layer 107 and the external electrode are electrically connected with each other.

Additionally, the upper protection layer 107 is divided into two regions, which are a first region (see FIG. 2A) including the heat acting portion formed above the heating element 108, and a second region (a region on a counter electrode side, see FIG. 2B) different from the first region, and electric connection is provided to each of the regions. In a case where there is no liquid on the substrate, the upper protection layer 107 in the first region and the upper protection layer 107 in the second region are not in mutual electric connection. However, in a case where the substrate is filled with the liquid such as ink containing an electrolyte, a current flows through this liquid, and the electrochemical reaction occurs at an interface between the upper protection layer 107 and the liquid. Although the ink used in the inkjet printing apparatus contains the electrolyte, since Ir is used for the upper protection layer 107 in the present embodiment, it is possible to cause the electrochemical reaction or the dissolution as long as there is ink. In this case, since the metal dissolution occurs on an anode electrode side, the anode side and a cathode side may be properly selected to apply a potential in order to remove the kogation on the beating element 108.

Moreover, although Ir is used as the upper protection layer 107 in the above-described configuration, another material may be used as long as it is a material that contains a metal that is dissolved by the electrochemical reaction, and it is a material that does not form a surface layer that prevents the dissolution by heating. Note that, the above-described "material that does not form a surface layer that prevents the dissolution by heating" does not mean a material that forms completely no surface layer but means a material that forms the surface layer to the extent that does not prevent the dissolution even if the surface layer was formed by heating. In a case of an Ir alloy or an Ru alloy, there is a tendency that the extent of the formation of the surface film is decreased as the content rate of Ir or Ru is great. Therefore, the composition of the metal forming the upper protection layer 107 can be selected according to the above-described tendency, the demanded metal durability, and the like.

<Steps of Producing Liquid Ejection Head Substrate>

Steps of producing the liquid ejection head substrate according to the present embodiment are described below. FIGS. 3A to 3F are each a schematic cross-sectional view describing the step of producing the liquid ejection head substrate according to the present embodiment, and the steps proceed in the order of FIGS. 3A, 3B, 3C, 3D, 3E, and 3F. Note that, usually, in the liquid ejection head manufacturing steps, in a state in which a driving circuit is produced in advance in the base 101 formed of Si, each layer is laminated over the base 101, and thus the liquid ejection head is manufactured. A semiconductor element and the like such as a switching transistor to selectively drive the heating element 108 are produced in advance in the base 101 as the driving circuit, and each layer is laminated thereover to form the liquid ejection head substrate. However, for the sake of shorthand. FIGS. 3A to 3F do not illustrate the driving circuit and the like arranged in advance.

First, the heat accumulation layer (not illustrated) formed of a $SiO_2$ thermal oxide film is formed as a lower layer of the heating element layer 104 on the base 101 by a thermal oxidation method, a sputtering method, a CVD method, and the like. Note that, it is possible to form the heat accumulation layer on the base in which the driving circuit is produced in advance through a driving circuit manufacturing process.

Next, the heating element layer 104 is formed on the heat accumulation layer, and the electrode wiring layer 105 is formed on the heating element layer 104. Specifically, the heating element layer 104 of TaSiN or the like is formed on the heat accumulation layer to have a thickness of about 20 nm by reactive sputtering. Then, an Al layer is formed on the heating element layer 104 to have a thickness of about 300 nm by sputtering to form the electrode wiring layer 105. Then, dry etching is performed on the heating element layer 104 and the electrode wiring layer 105 concurrently by using a photolithography method. Note that, in the present embodiment, a reactive ion etching (RIE) method is employed as the dry etching. Thereafter, the photolithography method is used again, and only the portion of the electrode wiring layer 105 that is the heating element 108 is removed by a wet etching method using mixed acid and the like. Thus, it is possible to form the heating element layer 104 and the electrode wiring layer 105 in the shape illustrated in FIG. 3A.

Figure 3A:
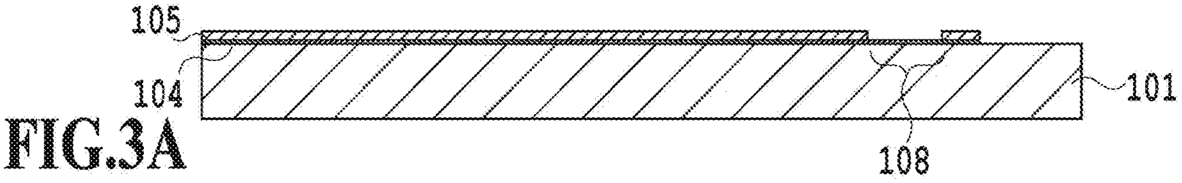
FIGS. 3A to 3F are diagrams illustrating steps of producing the liquid ejection head substrate.
Figure 3B:
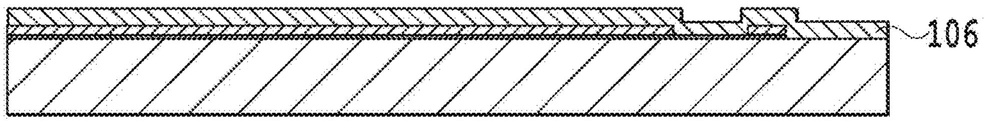

Next, as illustrated in FIG. 3B, a SiN film having a thickness of about 300 nm is formed as the first insulation protection layer 106 by using a plasma CVD method.

Figure 3C:
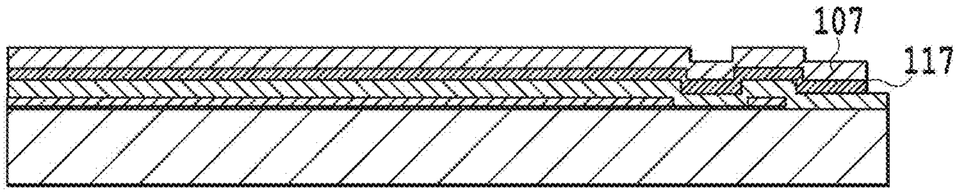

Next, as illustrated in FIG. 3C, a layer formed of Ta is formed by the sputtering method to have a thickness of about 30 nm as the adhesive layer 117 on the first insulation protection layer 106. Then, a layer formed of Ir is formed by the sputtering method to have a thickness of 50 nm as the upper protection layer 107 on the adhesive layer 117. In this process, in a case of the film formation of the Ir layer, the Ir layer is formed such that the average crystal particle diameter is changed in a film thickness direction by performing the film formation while changing the pressure in the chamber during the film formation from 1.0 Pa to 0.5 Pa. Note that, the adhesive layer 117 is formed in a region at least including the heat acting portion that is in contact with the liquid (ink) above the heating element. Additionally, although the method of changing the crystal particle diameter by changing the pressure during the film formation is employed in the present embodiment, another method may be employed. For example, a similar effect can be obtained by employing a method of changing the temperature during the film formation. As described above, the pressure during the film formation or the temperature during the film formation, which is a parameter (referred to as a film formation parameter) that can change the crystal particle diameter, may be changed as needed.

Next, the layers formed of Ir and Ta by dry etching are partially removed by using the photolithography method. In other words, the adhesive layer 117 and the upper protection layer 107 illustrated in FIG. 3C are partially removed. Thus, it is possible to obtain the shape illustrated in FIG. 3D.

Figure 3D:
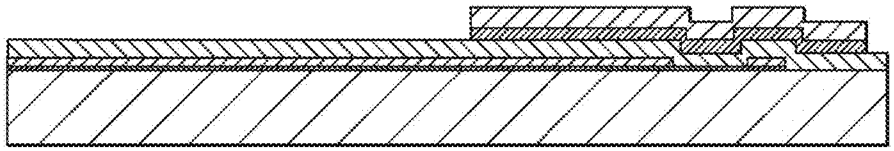

Next, the second insulation protection layer 116 is formed on the shape illustrated in FIG. 3D so as to cover an entirety of a top surface. Thus, it is possible to obtain the shape illustrated in FIG. 3E.

Figure 3E:
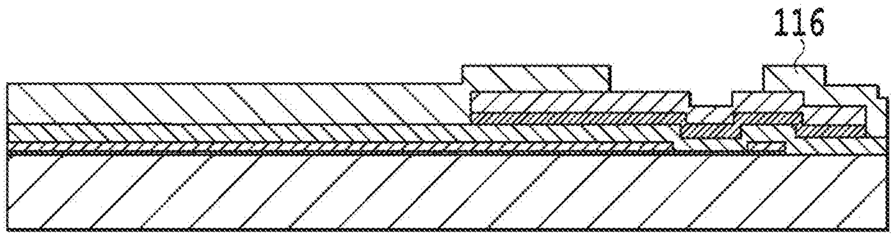
Figure 3F:
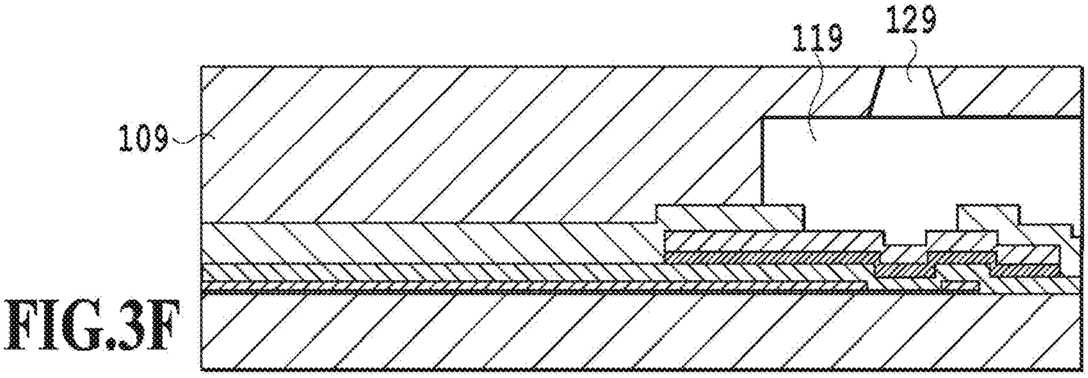

FIG. 3F is a schematic cross-sectional view describing a step of forming the liquid chamber in which the liquid is reserved and the liquid flow channel by using the substrate in the shape illustrated in FIG. 3E. A film formed of the above-described layers is formed over the base 101 (see FIG. 3E), and a resist as a solid layer, which is soluble so as to finally define a region of the liquid chamber, is applied by a spin coating method on the film. The resist material is formed of, for example, poly methyl isopropenyl ketone and acts as a negative resist. In the present embodiment, the resist layer is patterned into a desired shape of a liquid liquid chamber by using the photolithography technique. Subsequently, a coated resin layer is formed in order to form a flow channel wall and the ejection port 129 forming the flow channel formation member. In advance to forming this coated resin layer, it is possible to perform silane coupling treatment and the like as needed to improve the adhesiveness. The coated resin layer can be formed by properly selecting a conventionally-known coating method and applying resin to the liquid ejection head base on which a liquid chamber pattern is formed.

Next, the coated resin layer is patterned into a desired shape of a flow channel wall and an ejection port by using the photolithography technique. Thereafter, the liquid supply port (not illustrated) is formed from the back surface of the substrate by using an anisotropic etching method, a sandblasting method, an anisotropic plasma etching method, and the like. It is the most preferable to form the liquid supply port by a chemical silicon anisotropic etching method using tetramethyl hydroxylamine (TMAH), NaOH, KOH, and the like. Subsequently, whole surface exposure with Deep-UV light is performed, and developing and drying is performed to remove the soluble solid layer.

The liquid ejection head substrate is produced through the above-described steps.

The substrate produced as described above was on board the liquid ejection head. In a case where the liquid ejection was performed by using the liquid ejection head, with $5.0\times10^{8}$ times of the liquid ejection, the kogation was deposited on the heating element in the heat acting portion, and the liquid could not be ejected.

Therefore, as with the method described in Japanese Patent Laid-Open No. 2008-105364, the cleaning using the electrochemical reaction was conducted, and it was confirmed that the kogation was removed, the ejection performance was restored, and the film thickness of the upper protection layer 107 was decreased due to the dissolution. Thereafter, the liquid ejection and the cleaning were repeated, and the heating element 108 was broken in a case where the film thickness of the upper protection layer 107 was decreased to 10 nm. The number of times of the cleaning executed until reaching the breakage was eight, and the number of times of the liquid ejection was $4.0\times10^{9}$. Note that, in the present embodiment, as mentioned above, the iridium layer with the average crystal particle diameter of 1.5 nm was formed as the upper protection layer 107 on the side of the surface that is in contact with the adhesive layer 117. Additionally, the iridium layer with the average crystal particle diameter of 3.0 nm was formed on the side of the surface that defines the flow channel 119 and is in contact with the liquid.

Comparative Example

In the above-described embodiment, the upper protection layer 107 that is formed by laminating the multiple layers having the different average crystal particle diameters depending on the positions in a thickness direction (z direction) is employed. In contrast, for comparison, the upper protection layer is formed as a single layer having a single crystal particle diameter; however, the substrate is produced such that other configurations are similar to that of the above-described embodiment, and the thus-produced substrate is on board the liquid ejection head.

This liquid ejection head as the comparative example was evaluated similarly as the above-described embodiment. As a result, the heating element 108 was broken in a case where the film thickness of the upper protection layer 107 was decreased to 30 nm. The number of times of the cleaning executed until reaching the breakage was four, and the number of the liquid ejection was $2.0\times10^{9}$. Accordingly, it was known that a worse result than that of the above-described embodiment was obtained.

Second Embodiment

In the present embodiment, unlike the first embodiment, an iridium layer with the average crystal particle diameter in the film-formed surface direction of 3.0 nm was formed as the upper protection layer 107 on the side of the surface that is in contact with the adhesive layer 117. Additionally, an iridium layer with the average crystal particle diameter in the film-formed surface direction of 1.5 nm was formed as the upper protection layer 107 on the side that is in contact with the liquid (in other words, the side of the surface that defines the flow channel 119).

The substrate produced as described above was on board the liquid ejection head. This liquid ejection head was evaluated similarly as the above-described first embodiment and the comparative example 1. As a result, as with the first embodiment, it was confirmed that the film thickness of the upper protection layer 107 was decreased after the cleaning.

Thereafter, as with the first embodiment, the liquid ejection and the cleaning were repeated, and the heating element 108 was broken in a case where the film thickness of the upper protection layer 107 was decreased to 15 nm. The number of times of the cleaning executed until reaching the breakage was seven, and the number of times of the liquid ejection was $3.5\times10^9$. As a result, it was confirmed that the first embodiment is more preferable than the second embodiment, but the effect of the present disclosure can be developed also in the second embodiment.

Third Embodiment

In the present embodiment, unlike the first embodiment, an iridium layer with the average crystal particle diameter in the film-formed surface direction of 2.5 nm was formed as the upper protection layer 107 on the side of the surface that is in contact with the adhesive layer 117. Additionally, an iridium layer with the average crystal particle diameter in the film-formed surface direction of 3.0 nm was formed as the upper protection layer 107 on the side that is in contact with the liquid (in other words, the side of the surface that defines the flow channel 119).

The substrate produced as described above was on board the liquid ejection head. This liquid ejection head was evaluated similarly as the above-described first embodiment and the comparative example 1. As a result, as with the first embodiment, it was confirmed that the film thickness of the upper protection layer 107 was decreased after the cleaning.

Thereafter, as with the first embodiment, the liquid ejection and the cleaning were repeated, and the heating element 108 was broken in a case where the film thickness of the upper protection layer 107 was decreased to 20 nm. The number of times of the cleaning executed until reaching the breakage was six, the number of times of the liquid ejection was $3.0\times10^9$. As a result, it was confirmed that the first embodiment is more preferable than the third embodiment, but the effect of the present disclosure can be developed also in the third embodiment.

As a result, it is clear that, as a difference between the crystal particle diameters described above is greater, the entering path of the oxygen is more complicated, and the film thickness of the upper protection layer in a case of reaching the breakage is smaller. Specifically, it is more preferable that the average crystal particle diameter of the upper protection layer on the side that is in contact with the liquid is formed to be more than double the average crystal particle diameter of the upper protection layer on the surface that is in contact with the adhesive layer.

Fourth Embodiment

In the present embodiment, first, an Ir layer with a thickness of 25 nm was film-formed as a first portion 107*a* of the upper protection layer on the side of the surface that is in contact with the adhesive layer 117. Then, an inorganic film, which is specifically a Ta layer with a thickness of 10 nm, was film-formed thereon as a crystal control layer. Additionally, under the different condition from that for the first portion 107*a*, an Ir layer of a thickness of 25 nm was film-formed thereon as a second portion 107*b* of the upper protection layer. Thus, the upper protection layer 107 of the present embodiment was formed of the first portion 107*a*, the crystal control layer (Ta layer), and the second portion 107*b*.

In this case, the average crystal particle diameter of the first portion 107*a* was formed to be 1.5 nm, and the average crystal particle diameter of the second portion 107*b* was formed to be 3.0 nm. The substrate produced as described above was on board the liquid ejection head.

This liquid ejection head was evaluated similarly as the above-described first embodiment and the comparative example 1, and an evaluation result substantially similar to that of the first embodiment was obtained.

According to the present disclosure, it is possible to suppress a reduction in the gas barrier property in a case where a cavitation resistance layer becomes thin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-197251, filed Dec. 9, 2022, which are hereby incorporated by reference wherein in its entirety.

What is claimed is:

1. A liquid ejection head substrate, comprising:

a first layer that forms a heating element that generates heat energy to eject a liquid;

a second layer that functions as an electric wiring connected with the heating element;

a third layer that is insulative and covers the first layer and the second layer;

a fourth layer that is a layer arranged over the third layer so as to cover at least the heating element, formed of metal, and to generate an electrochemical reaction with the liquid, in which a first average crystal particle diameter on a side that is in contact with the liquid and a second average crystal particle diameter on a side of the third layer are different; and further comprising:

a fifth layer arranged on the third layer and formed of tantalum, wherein the fourth layer is formed of iridium and is in contact with the third layer through the fifth layer.

2. The liquid ejection head substrate according to claim 1, wherein the fourth layer is formed of a material containing iridium or ruthenium.

3. The liquid ejection head substrate according to claim 1, wherein the fourth layer is formed of a noble metal.

4. The liquid ejection head substrate according to claim 1, wherein the fourth layer is formed of a material that contains a metal that is dissolved by the electrochemical reaction with the liquid and that does not form a surface layer that prevents the dissolution by heating.

5. The liquid ejection head substrate according to claim 1, wherein each of the first average crystal particle diameter and the second average crystal particle diameter is an average crystal particle diameter as a length of the fourth layer in a film-formed surface direction.

6. The liquid ejection head substrate according to claim 1, wherein the fourth layer is arranged over the third layer with a fifth layer with conductivity being arranged therebetween.

7. The liquid ejection head substrate according to claim 1, further comprising a fifth layer arranged on the third layer and formed of a base metal, wherein the fifth layer is formed in a region including a heat acting portion that is in contact with the liquid above the heating element.

8. The liquid ejection head substrate according to claim 7, wherein the fifth layer is formed of a base metal including tantalum.

9. The liquid ejection head substrate according to claim 1, wherein the fourth layer is electrically connected with the second layer through a through-hole formed in the third layer so as to be an electrode that generates the electrochemical reaction.

10. The liquid ejection head substrate according to claim 1, wherein the first average crystal particle diameter is greater than the second average crystal particle diameter.

11. The liquid ejection head substrate according to claim 10, wherein the first average crystal particle diameter is more than double the second average crystal particle diameter.

12. The liquid ejection head substrate according to claim 1, wherein an average crystal particle diameter in the fourth layer is changed in a film thickness direction.

13. The liquid ejection head substrate according to claim 1, wherein the fourth layer includes a first portion having the second average crystal particle diameter and a second portion having the first average crystal particle diameter, and a layer formed of an inorganic film is arranged between the first portion and the second portion.

14. The liquid ejection head substrate according to claim 1, wherein the first average crystal particle diameter is greater than the second average crystal particle diameter.

15. A liquid ejection head, comprising:

a substrate including:

a first layer that forms a heating element that generates heat energy to eject a liquid;

a second layer that functions as an electric wiring connected with the heating element;

a third layer that is insulative and covers the first layer and the second layer;

a fourth layer that is a layer arranged over the third layer so as to cover at least the heating element, formed of metal, and to generate an electrochemical reaction with the liquid, in which a first average crystal particle diameter on a side that is in contact with the liquid and a second average crystal particle diameter on a side of the third layer are different; and further comprising:

a fifth layer arranged on the third layer and formed of tantalum, wherein the fourth layer is formed of iridium and is in contact with the third layer through the fifth layer.

16. The liquid ejection head substrate according to claim 15, wherein the first average crystal particle diameter is greater than the second average crystal particle diameter.

* * * * *